July 18, 1939.  C. J. RENNEKAMP  2,166,553

UPHOLSTERY CLIP

Filed May 3, 1938

INVENTOR.
Clarence J. Rennekamp
BY Wood & Wood  ATTORNEYS.

Patented July 18, 1939

2,166,553

UNITED STATES PATENT OFFICE 2,166,553

UPHOLSTERY CLIP

Clarence J. Rennekamp, Silverton, Ohio, assignor to The Auto-Vehicle Parts Company, Newport, Ky., a corporation of Kentucky Application May 3, 1938, Serial No. 205,766

3 Claims. (Cl. 24—73)

This invention relates to improvements in a clip or fastening device for securing upholstery coverings, such as cloth and other like materials. The invention is directed particularly to a fastening clip to be utilized in securing protective coverings to the interior wall and door panels of automobiles, or other similar uses.

Such coverings are usually applied over the regular upholstered panels of the car either to renew or protect the upholstery. The coverings usually are purchased from the dealer in complete sets, fitted and ready for installation to the particular model or make of car. The objective of this invention has been to provide clips by means of which these ready-made coverings can be easily and quickly installed in the automobile either by the owner, or by the garage mechanic.

The bodies and frames of the earlier automobiles were constructed of wood framing. Into this framing the upholstery material was fastened by means of tacks or screws. In recent years, however, the bodies, frames, and doors of automobiles have been made entirely of metal, and the use of pointed fasteners is no longer possible. The basis upon which this invention is predicated resides in the concept of providing a metal fastener which is sufficiently thin to be inserted in the crevices at the seams and joints of the body or the doors. This metal clip is provided with means for holding it rigidly and firmly in the crevice or seam into which it has been installed, and is provided also with a series of clinchers. The upholstery material or fabric covering is slipped into these clinchers after the clips have been installed; the clinchers are then brought into engagement with the fabric and serve to hold it securely in the intended position.

The primary objective of the invention, therefore, has been to provide a fastener clip constructed and arranged to be anchored at the marginal frame, molding, or edging of a panel to be covered with fabric, and also having clincher means for fastening the covering material to the clip so as to hold the covering material in place.

An objective of the invention has been to provide a fastening clip suited to be installed likewise in the cracks or crevices constituted by the joints or seams of the metal pieces forming the automobile structure and to be anchored into place either by means of a mechanical anchor or by means of a driving connection with metal bounding the crevice.

Briefly, these fasteners of the invention are comprised of a body member, means for holding this body member to the metal molding, edging, or trimming of the automobile body, and means for holding the fabric covering or upholstery to the body member. The body member preferably is a substantially flat and relatively thin piece of metal; the thickness preferably is not too great to permit this body member to be pressed or driven into the metal seams of the body and doors. The means for holding the fabric to the body member is constituted by one or a plurality of clincher pieces or tangs; these are normally in distended position, so that the fabric can be slipped underneath them, and they are adapted to be bent toward the body member to hold the fabric securely in position. Preferably, means for anchoring the body member to the metal of the automobile comprises one or a plurality of anchor clips or spring locks suited for locking engagement with the metal of the automobile body when the fastener reaches its final position.

A preferred embodiment of the invention is illustrated in the drawing. In view of the foregoing explanation of the principles of the invention and the following description of the preferred embodiment of it, those skilled in the art will be able to make modifications of the device which is shown and described should such modifications be necessary or desirable to suit the device to a particular type of automobile construction or for other purposes of a similar nature. In the drawing.

Figure 1:
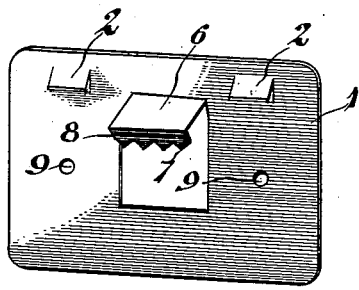
Figure 1 is an enlarged perspective view of the fastening clip.
Figure 2:
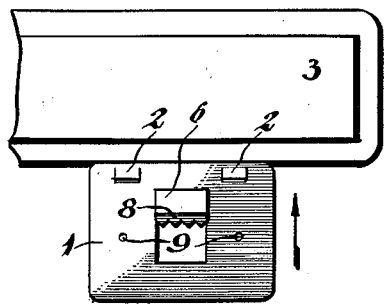
Figure 2 illustrates the clip positioned preparatory to being driven under the molding.
Figure 3:
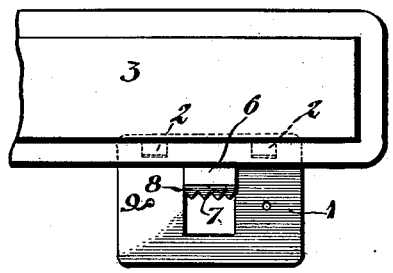

Figure 3 illsutrates the clip, having been driven in and anchored in place under the molding and ready for the installation of the covering material.

Figure 5:
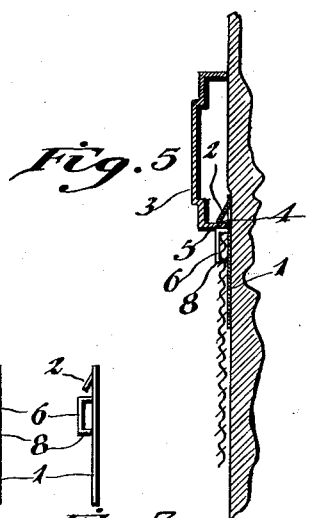

In using the devices, the clip is driven or slipped between the molding or frame member and the upholstered panel. Door and window frame moldings, for instance, are usually of channel shape somewhat as shown in Figure 5. The upholstery is sufficiently pliable or yielding to permit it to be depressed to slide the fastener beneath the molding or trimming.

When the lower edges 4 of the tangs pass the edge of the lower wall 5 of the molding, or trimming, the resiliency of the upholstery causes the fastener to spring outwardly, and the tangs thus are caused to interlock with the trimming and prevent easy or inadvertent withdrawal of the clip from their installed position.

The clamping tang or clincher of the clip is constructed to constitute the jaw cooperable with the body of the clip to hold the fabric. However, this tang also is positioned in relation to the anchor clips to act as a stop serving to determine the correct alignment of the clip with respect to the molding.

Figure 4:
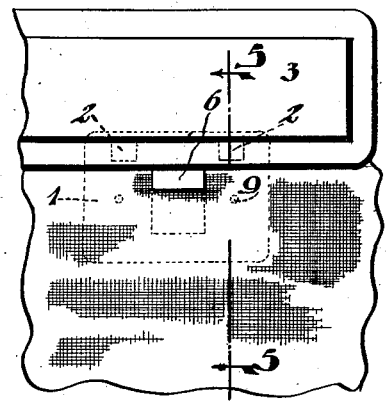

Figure 4 illustrates the covering material in place over the clip and secured thereby.

Figure 5 is a sectional view taken on line 5—5, Figure 4.

Figure 6:

Figure 6 is a side elevation of the clip, showing the position of the clamping tang, prior to clamping.

Figure 7:

Figure 7 is a view similar to Figure 6, but showing the clamping tang in its clamped position.

Referring to the drawing, the fastener comprises a substantially flat or plane body 1 which is of rectangular outline. This fastener is formed of a single piece of light gauge metal and may be fabricated by stamping in a die press. The body, near its upper edge or margin, has a pair of tangs 2—2 which are integral with and protrude from one side of the body, the tangs providing barbs adapting the margin of the plate to be slipped into a crevice in the upholstery so as to anchor the fastener in place, as shown in the drawing, beneath the edge of the molding 3, or the like.

The anchor clips extend outwardly and downwardly on an inclined plane from the surface of the body of the clip in order to facilitate insertion under the moldings or frame members of the car. The metal of which the fastener is formed is sufficiently thin to avoid outward displacement of the molding upon insertion thereunder.

The tang 6 is struck outwardly from the center of the body and preferably is of U- or channel-shape in cross section and normally bent angularly outwardly so as to form a throat for the insertion of the covering material. In addition, the U-shape of the tang provides clearance for the hem or edge of covering material when the tang is turned or pressed inwardly to clasp the covering material.

The free edge of the clamping tang is preferably serrated or corrugated as at 7 to constitute a toothed jaw 8, which is suited to hold the upholstery fabric or covering material firmly without tearing it. After the fasteners have been installed under the several door and window frame moldings, the panel is ready for the application of the covering material.

The marginal edge of the covering material is inserted under one of the clamping tangs inwardly, the full depth of the throat, so that the edge of the material is in contact with the frame molding. The clamping tang is then clinched or depressed to cause the teeth of the clamping jaw to bite into and grip the covering material.

The material may now be pulled taut and engaged progressively under successive fasteners until all are engaged. In this manner the covering material can be drawn and arranged to fit closely the marginal frame moldings. The forming of wrinkles and other irregularities, which might otherwise result, is avoided.

When the covering material is in place in the panel, the fasteners are concealed thereunder with only a minimum portion of the clamping tang visible. Accordingly, the installation is neat in appearance, and the fastening clips are permanently secured against displacement or sagging.

The fasteners are formed of light gauge ductile sheet metal to facilitate bending of the clamping tangs for engagement with the covering material. For this reason, the clamping tang will not readily crystallize upon repeated bending, thus permitting the turning back of the clamp tangs for removal of the upholstery coverings, for such purposes as cleaning or replacement. The clips can be left in place and the clamping tangs unclinched and bent back out of engagement, to be subsequently depressed into clamping engagement when the coverings are replaced, the body of the clip being undisturbed.

The clip body is provided additionally with a pair of tack holes 9—9 for attaching purposes. These holes may be utilized for attachment to panels other than those specified, for example, on panels having no framing members and where it is possible to drive screws or tacks.

Having described my invention, I claim:

1. An upholstery fastener comprising a flat metal body, anchor tangs extending outwardly from the face of the body within a margin thereof, and a channel-shaped clinching tang extending outwardly and centrally from the face of the body, adapted to be depressed inwardly for gripping the material applied over said body and under said tang.

2. An upholstery fabric fastener as an article of manufacture comprising a sheet metal plate having a margin adapted to be slipped into a crevice, or the like, a plurality of tangs bent from the margin of the plate, providing barbs to hold the plate against extraction from the crevice, and a claw of channel form in cross section bent out and formed from the body of the plate, its rear end providing an obstruction to limit the depth of plate marginal insertion into a crevice, and normally having its forward end outstanding permitting the insertion of a margin of upholstery fabric between the claw and plate, said claw adapted to be bent to clasp and clinch the fabric to the plate.

3. An upholstery fabric fastener as an article of manufacture comprising a sheet metal plate for marginally slipping into a crevice, or the like, having a tang bent from the margin of the plate providing a barb to hold the plate against extraction from the crevice, and a claw having a lateral free end pressed out and formed from the body of the plate, normally outstanding therefrom whereby the margin of upholstery fabric may be received between the plate and the claw, said claw compressible to clasp and clinch the fabric to the plate.

CLARENCE J. RENNEKAMP.